US011117291B2

(12) United States Patent
Schwarzbaum et al.

(10) Patent No.: US 11,117,291 B2
(45) Date of Patent: Sep. 14, 2021

(54) CURING SYSTEM FOR PRINTING OF 3D OBJECTS

(71) Applicant: MASSIVIT 3D PRINTING TECHNOLOGIES LTD, Lod (IL)

(72) Inventors: Arie Schwarzbaum, Karnei Shamron (IL); Yoav Aboudi, Kiriat Ono (IL); Igor Yakubov, Herzelya (IL); Moshe Uzan, Bet Shemesh (IL)

(73) Assignee: MASSIVIT 3D PRINTING TECHNOLOGIES LTD, Lod (IL)

( * ) Notice: Subject to any disclaimer, the term of this patent is extended or adjusted under 35 U.S.C. 154(b) by 604 days.

(21) Appl. No.: 15/545,469

(22) PCT Filed: Jan. 18, 2016

(86) PCT No.: PCT/IL2016/050057
§ 371 (c)(1),
(2) Date: Jul. 21, 2017

(87) PCT Pub. No.: WO2016/125138
PCT Pub. Date: Aug. 11, 2016

(65) Prior Publication Data
US 2018/0311898 A1 Nov. 1, 2018

Related U.S. Application Data

(60) Provisional application No. 62/110,616, filed on Feb. 2, 2015.

(51) Int. Cl.
*B29C 64/264* (2017.01)
*B33Y 30/00* (2015.01)
(Continued)

(52) U.S. Cl.
CPC ........ *B29C 35/0805* (2013.01); *B29C 64/118* (2017.08); *B29C 64/209* (2017.08);
(Continued)

(58) Field of Classification Search
CPC ... B29C 64/277; B29C 64/282; B29C 64/209; B29C 64/264; B29C 64/268;
(Continued)

(56) References Cited

U.S. PATENT DOCUMENTS 8,038,427 B2 * 10/2011 Kritchman .............. G06F 30/00
425/174.4
2005/0116179 A1 6/2005 Aguirre et al.
(Continued)

FOREIGN PATENT DOCUMENTS

CN      103921445 A      7/2014
WO      2014/204020 A1   12/2014
WO      WO-2014204020 A1 * 12/2014 ............. B33Y 30/00

OTHER PUBLICATIONS

Written Opinion of the International Searching Authority, PCT/IL2016/050057, dated Aug. 12, 2016.
International Search Report for PCT/IL2016/050057.

*Primary Examiner* — Philip C Tucker
*Assistant Examiner* — Jimmy R Smith, Jr.
(74) *Attorney, Agent, or Firm* — Smith Tempel Blaha LLC; Gregory Scott Smith

(57) ABSTRACT

A curing system for printing of 3D objects having one or more sources of curing radiation moveably attached to and flanking at least one side of an extrusion head and extrusion nozzle wherein the extrusion head and extrusion nozzle and the at least one source of curing radiation act in unison as a single unit wherein curing of deposited curable material is applied concurrently with or immediately following deposition of the curable material.

4 Claims, 9 Drawing Sheets

(51) Int. Cl.
  *B29C 64/209* (2017.01)
  *B29C 64/277* (2017.01)
  *B29C 35/08* (2006.01)
  *B29C 64/118* (2017.01)
(52) U.S. Cl.
  CPC .......... *B29C 64/264* (2017.08); *B29C 64/277* (2017.08); *B33Y 30/00* (2014.12); *B29C 2035/0827* (2013.01)
(58) Field of Classification Search
  CPC ............ B29C 71/04; B29C 2035/0827; B29C 2045/0075; B29C 33/06; B29C 35/0805
  USPC ................................................ 425/174, 174.4
  See application file for complete search history.

(56) References Cited

U.S. PATENT DOCUMENTS

2007/0252871 A1    11/2007  Silverbrook
2009/0207223 A1     8/2009  Cofler et al.
2010/0140849 A1*    6/2010  Comb .................... B29C 64/106
                                                        264/401
2011/0298877 A1*   12/2011  Blessing ................ B41J 11/002
                                                        347/102
2016/0144570 A1*    5/2016  Kim .................... B29C 35/0805
                                                        425/174.4
2017/0361505 A1*   12/2017  Abbott, Jr. ............ B29C 64/277

* cited by examiner

CURING SYSTEM FOR PRINTING OF 3D OBJECTS

FIELD OF TECHNOLOGY

The apparatus and method are related to the field of additive manufacturing and particularly to curing of curable material layers deposited by additive manufacturing devices.

BACKGROUND

Three dimensional objects manufacturing processes involve deposition of a curable resin material layer in an imagewise manner and curing or hardening of the deposited segments of the layer. The layers are deposited (added) on top of each other and hence the process is called an additive manufacturing process by means of which a computer generated 3D model is converted into a physical object. The process involves generation of a plurality of material layers of different or identical shape. The layers are laid down or deposited on top (or bottom) of each of the preceding layer until the amount of accumulated layers results in a desired three dimensional physical object.

The material from which the layers of the three-dimensional physical object are generated could come in liquid, paste, powder, gel and other forms. Conversion of such materials into a solid form is typically performed by suitable actinic radiation or heat. Different manufacturing techniques such as inkjet printing, laser sintering, material extrusion and others are used for manufacture of 3D objects.

Manufacturing of 3D objects spans over a large range of applications. This includes prototype manufacture, small runs of different products manufacture, decorations, sculptures, architectural models and other physical objects.

Recently, manufacture of relatively large size physical objects and models has become more prevalent. Large size statues, animal figures and decorations are manufactured by additive manufacturing processes and used in various carnivals, playgrounds, and supermarkets. Where the manufacturing technology allows, some of these physical objects are manufactured as a single piece at a 1:1 scale. Some are manufactured in large scale parts that are later assembled into the physical object at the installation site.

The time required to build a three-dimensional object depends on various parameters such as for example, curing time of the resin material using UV radiation, the speed of adding solid or liquid material to the layer which depends on the material itself, layer thickness, the intensity of the curing agent and the desired resolution of the three-dimensional object details and others. In most 3D objects manufacturing techniques and especially inkjet printing material is deposited in a raster deposition mode and curing is performed in flood illumination mode. Material extrusion supports manufacture of 3D objects in vector mode and the curing of the extruded material could be performed in local or regional curing mode.

One of the common sources of curing radiation are Ultraviolet (UV) light sources and in particular Light Emitting Diodes (LEDs). UV LED illuminators are used in various configurations such as linear arrays or two dimensional matrices and are employed as UV light flooding illuminators. The existing UV LED based curing sources do not provide sufficient energy to cure extruded curing materials used for 3D objects manufacture. Moreover, the curing techniques currently employed do not allow for rapid throughput mainly due to low energy levels at the curing site requiring longer curing times.

It has also been found to be technically challenging to provide and maintain uniform and sufficient curing energy to cure the deposited curable material or resin in 3D object additive manufacturing in general and especially when the material deposition unit changes the travel direction to meet the geometry of the 3D object being manufactured. This has been found to be especially true in vector printing mode and specifically in vector printing of 3D large objects in forms of shells or hollow structures as described in Patent Provisional Application No. 61/941,494, filed on Feb. 19, 2014 and assigned to the same assignee of the current application.

SUMMARY OF THE INVENTION

Providing homogenous distribution of effective curing energy to a limited area inside which a curable material or resin is being deposited to form the construction of a 3D object is quite challenging. A greater challenge is presented when effective curing must support movement of the curing sector. Even more challenging is providing the curing energy with directionality since movement of the curing area needs to be executed in any arbitrary direction in 3-D space concurrently with a vector material deposition nozzle.

It has been found that arranging at least two linear UV curing radiation sources in a configuration such that the UV curing radiation sources together can form a limited area of homogenous effective curing energy distribution. The extrusion nozzle can then be positioned so that the nozzle extrudes the curable material in the center of the limited area. Once the positioning of the nozzle has been complete—the size of the limited area and spatial relation between the extrusion nozzle and the limited area does not change throughout the printing session and the extrusion nozzle travel direction. This provides both an effective localized printing area together with directionality thereof.

Transformation of linear distribution of radiation intensity provided by two liner sources into a limited area such as, for example, one generally circular zone (sector) with homogenous energy distribution provides almost maximal uniform level of radiation energy or fluence, uniformly distributed throughout the sector so that to effectively (fully) cure the deposited resin material.

BRIEF DESCRIPTION OF THE DRAWINGS

In order to understand the apparatus and method and to see how it may be carried out in practice, examples will now be described, by way of non-limiting example only, with reference to the accompanying drawings, in which.

DETAILED DESCRIPTION OF THE INVENTION

Figure 1:
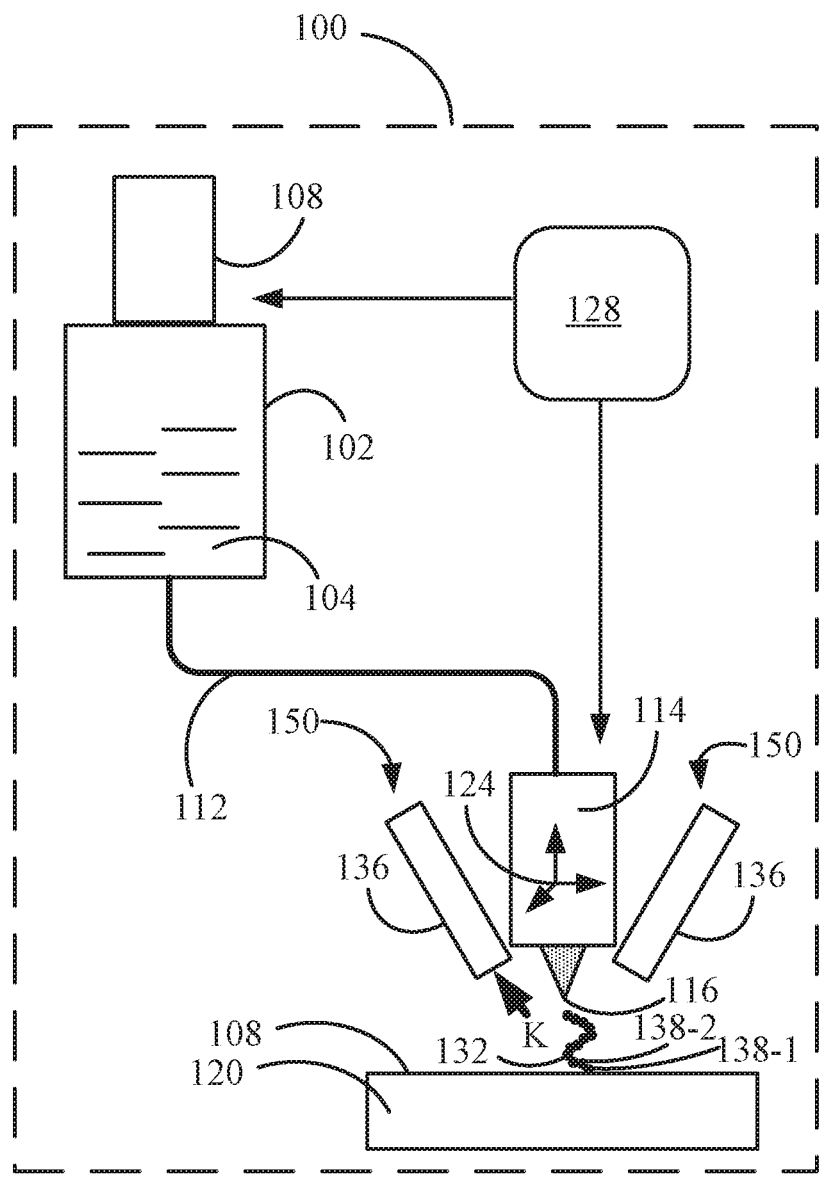
FIG. 1 is a schematic simplified illustration of a system suitable for manufacture by additive printing of three-dimensional structures in accordance with an example.

Reference is made to FIG. 1 which is a schematic simplified illustration of an example of a vector printing system suitable for manufacture by additive printing of three-dimensional structures. vector printing system 100 includes a storage or material supply tank 102 adapted to store a curable material 104, such as, for example, a pseudoplastic high viscosity material, a pump 108 configured to agitate and shear thin the curable material 104, to reduce material 104 viscosity and cause the material to flow. Pump 108 in addition to agitation also develops a pressure higher than atmospheric pressure such that curable material 104 flows through a delivery tubing or system 112 to an extrusion head extrusion nozzle 116. The higher than atmospheric pressure developed by the pump is communicated to extrusion head 114 extrusion nozzle 116 and could be such as 0.1 bar to 30.0 bar and typically from 1.0 bar to 20.0 bar and sometimes 2.0 bar to 10.0 bar.

Vector printing system 100 includes an X-Y-Z directional vector movement system 124 configured to move the extrusion nozzle 116 in 3D space, i.e., in a three directions (X-Y-Z). Alternatively, a printing table 120 could be made to move in a three coordinate system. In another example, the movement in 3D space, i.e. in three directions (X-Y-Z) could result from combined movement in two or three directions (X-Y-Z) of both the extrusion nozzle 116 and printing table 120. System 100 also includes a computer 128 configured to control operation of movement system 124, pump 108 performing the curable material steering operation and value or magnitude of the higher than atmospheric pressure.

Computer 128 is further adapted to receive data regarding a three-dimensional object 132 being printed and generate from the received data the X-Y-Z directional vector movement commands and distance such that the curable material 104 is extruded through extrusion head 114 and extrusion nozzle 116 in an image wise manner. The X-Y-Z directional vector movement could be performed in a vector mode or raster mode, depending on the object to be printed. Computer 128 could also be configured to optimize the selection of the printing mode as well as select the radiation power output based on the characteristics of the object being printed and the curing requirements thereof.

Vector printing system 100 further includes a curing system 150, which includes one or more sources of curing radiation 136. Source of curing radiation 136 could be UV LED such as FireFly™ or Phoseon FE300 commercially available from Phoseon Technology, Inc., Hillsboro Oreg. 97124 USA. Source of curing radiation 136 can provide UV radiation with total UV power of up to 900 W and wavelength range of 380-420 nm. Alternatively, a UV lamp such as for example, mercury vapor lamp model Shot 500 commercially available from CureUV, Inc., Delray Beach, Fla. 33445 USA can be employed. Source of curing radiation 136 operates in a continuous manner concurrently with the deposition of the curing material and the radiation is selected to cure and harden curable material 104. Computer 128 could also be configured to control operation of source of curing radiation 136 and synchronize it with the printing mode.

In additive vector printing and manufacturing of 3D large objects in forms of shells or hollow structures such as described in Patent Provisional Application No. 61/941,494, filed on Feb. 19, 2014 and assigned to the same assignee of the current application, computer 128 can receive data of a three-dimensional object 132 and generate from the received data the X-Y-Z directional vector movement commands and length of strips such as 138-1, 138-2 to be deposited one above or below the other, such that the curable material 104 extruded through extrusion (head) extrusion nozzle 116 in an image wise manner resembles a slice of object 132. In a similar manner a following strip or a portion of the curable material 104 is extruded.

Figure 2:
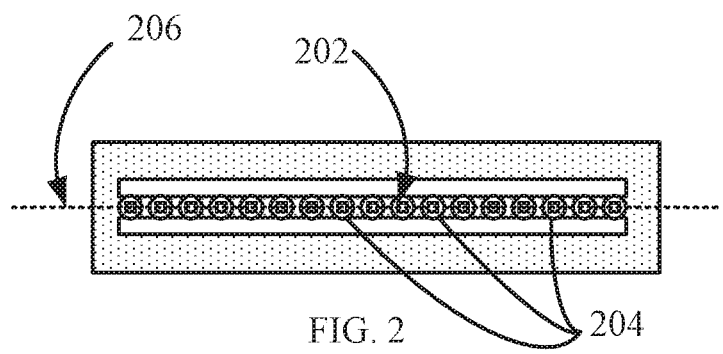
FIG. 2 is a plan view simplified illustration of source of curing radiation in accordance with another example.

FIG. 2, which is a plan view simplified illustration of curing system for printing of 3-D objects 150 source of curing radiation 136 as viewed from a direction indicated by an Arrow (K) (FIG. 1) can include an array 202 of LEDs 204 arranged along a central longitudinal axis 206. When source of curing radiation 136 is attached to extrusion head 114 axis 206 is parallel to surface 118 of table 120 (FIG. 1). Each of LEDs 204 can provide a flux of radiation of 1 Watt, hence the total flux depends on the number of LEDs 204 in the array. Array 202 of LEDs 204 can be a linear array such as that depicted in FIG. 2 or have any suitable geometry including a geometry such as for example a ring (FIGS. 6 and 7) or a square (FIG. 8). The number of LED units per array 202 can vary between 10 and 40 LEDs. More commonly the array can include between 15 and 35 LEDs and most commonly the array can include between 20-30 LEDs producing a total flux of radiation of 20-30 Watt.

Figure 3:
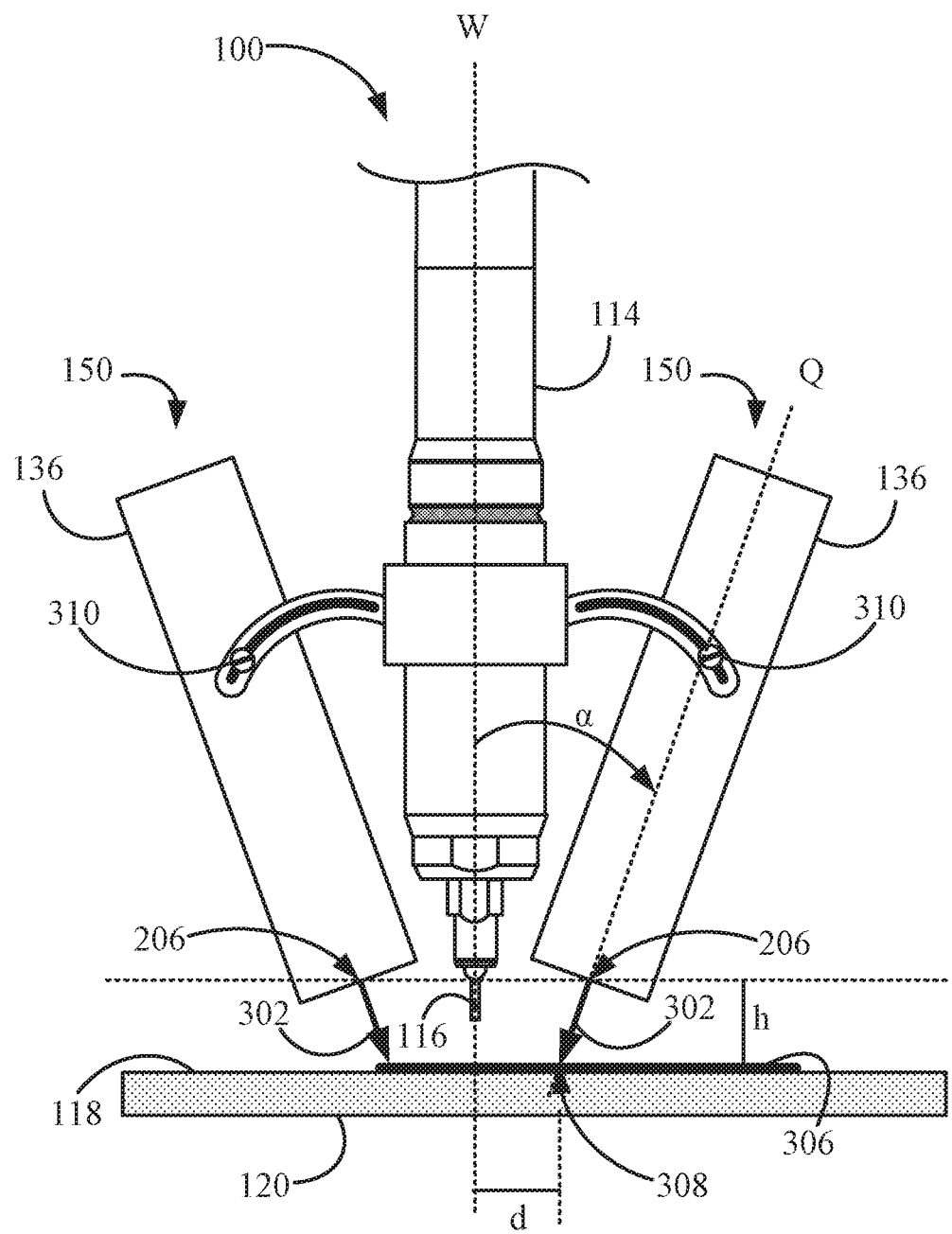
FIG. 3 is an elevated lateral view simplified illustration of the positioning of one or more sources of curing radiation relative to an extrusion head and nozzle in accordance with yet another example.

Referring to FIG. 3, which is an elevated lateral view simplified illustration of the positioning of the curing system for printing of 3-D objects 150 one or more sources of curing radiation 136 relative to extrusion head 114 and extrusion nozzle 116. As shown in FIG. 3, one or more sources of curing radiation 136 can be moveably attached to extrusion head 114 flanking extrusion head 114 from at least one side thereof. In one example two sources of curing radiation 136 including linear arrays 202 of LEDs 204 can be moveably) attached to extrusion head 114 in a manner that supports change of an angle (a) with respect to axis W and distance to plane 306. Corresponding central axes 206 (FIG. 2) of arrays 202 can be parallel to each other and to surface 118 of printing table 120 and emit a UV radiation beam 302 onto the surface of the extruded material 306 to be cured.

In FIG. 3, sources of curing radiation 136 flank extrusion head 114 from opposite sides, sandwiching extrusion head 114 therebetween. It will be appreciated by persons skilled in the art that sources of curing radiation 136 can be attached to extrusion head 114 at various positions relative to each other and to extrusion nozzle 116 such as, for example, central longitudinal axis 206 of each of radiation sources 136 being normal to central longitudinal axis 206 of the other (e.g., as depicted in FIG. 8) and parallel to surface 118 of printing table 120 or at any other desired relative angle between central longitudinal axes 206 of any two or more sources of curing radiation 136. Alternatively and optionally, a single ring-form source of curing radiation 636 (FIG. 6) can be attached to extrusion head 114 so that to concentrically surround extrusion nozzle 116.

Attachment of one or more sources of curing radiation 136 to extrusion head 114 allows sources of curing radiation 136 to translate concurrently with extrusion head 114 and maintain a constant relationship between the homogenously illuminated area that could be, for example, of a round shape and nozzle 116 independent of travel direction.

Sources of curing radiation 136 can follow the exact course of translation of extrusion head 114 extrusion nozzle 116 in 3D space during and throughout the curable material 104 deposition process including changes in elevation and back and forth movement as well as abrupt and sharp turns. Curing radiation from sources 136 can be applied in a continuous manner so that curable material 104 is deposited in an area already being impinged on by curing radiation. Hence, the curing system 150 of system for printing of 3-D objects 100 also supports almost immediate curing of the deposited curable material concurrently with or almost immediately following the deposition of the curable material as will be explained in greater detail below.

Attachment of one or more sources of curing radiation 136 of the curing system for printing of 3-D objects 150 to extrusion head 114 supports the application of uniform and constant parameters of UV curing energy to the deposited curable material as it is being deposited by extrusion head 114 (i.e., concurrently with the deposition of curable material 104). These parameters can include, among others, the spot size and fluence (translated into heat) of the irradiated UV impinging on the deposited printing curable material as will be explained in greater detail below. Sources of curing radiation 136 of the curing system for printing of 3-D objects 150 can be attached to extrusion head 114 according to specific positioning parameters so that the central longitudinal axis 206 of array 202 (in FIG. 3 axes 206 are normal to the plane of the paper), running parallel to, is maintained at an elevation (h) above the surface of the layer being printed 306 (i.e., the layer to be cured) at any given time. Sources of curing radiation 136 are also attached to extrusion head 114 at an angle (a) between the central axis (W) of extrusion head 114 and central axis (Q) of sources of curing radiation 136 so that a point of impingement 308 of the center of UV radiation beam 302 from sources of curing radiation 136 on the surface of the layer being printed (i.e., the layer to be cured) is at a distance (d) from the central axis (W) of the extrusion head extrusion nozzle at any given time.

Positioning parameters angle (a), elevation (h) and distance (d) can be adjusted and fixed as desired by loosening and tightening locking screws 310.

In some cases angle (a) can be between 5 and 35 degrees, more commonly between 10 and 30 degrees and most commonly between 15 and 25 degrees. Elevation (h) can be in some cases between 5 and 35 mm, more commonly between 10 and 30 mm and most commonly between 15 and 25 mm. Distance (d) can be in some cases between 5 and 35 mm, more commonly between 10 and 30 mm and most commonly between 15 and 25 mm.

This configuration supports the curable material deposition components, namely extrusion head 114 and extrusion nozzle 116 in concert with the curing system for printing of 3-D objects 150 sources of curing radiation 136 to act in unison as one single unit. Hence, the X-Y-Z directional vector movement system 124 configured to move extrusion nozzle 116 in 3D space (i.e., in three directions X, Y and Z) projects the same attributes on the curing system for printing of 3-D objects 150 sources of curing radiation 136 so that sources of curing radiation 136 are also and concurrently moved in 3D space, by directional vector movement system 124. Therefore, X-Y-Z directional vector movement system 124 concurrently provides also curing system for printing of 3-D objects 150 sources of curing radiation with a vector directional movement that shadows the vector directional movement of extrusion head 114 and extrusion head 116.

Figure 4:
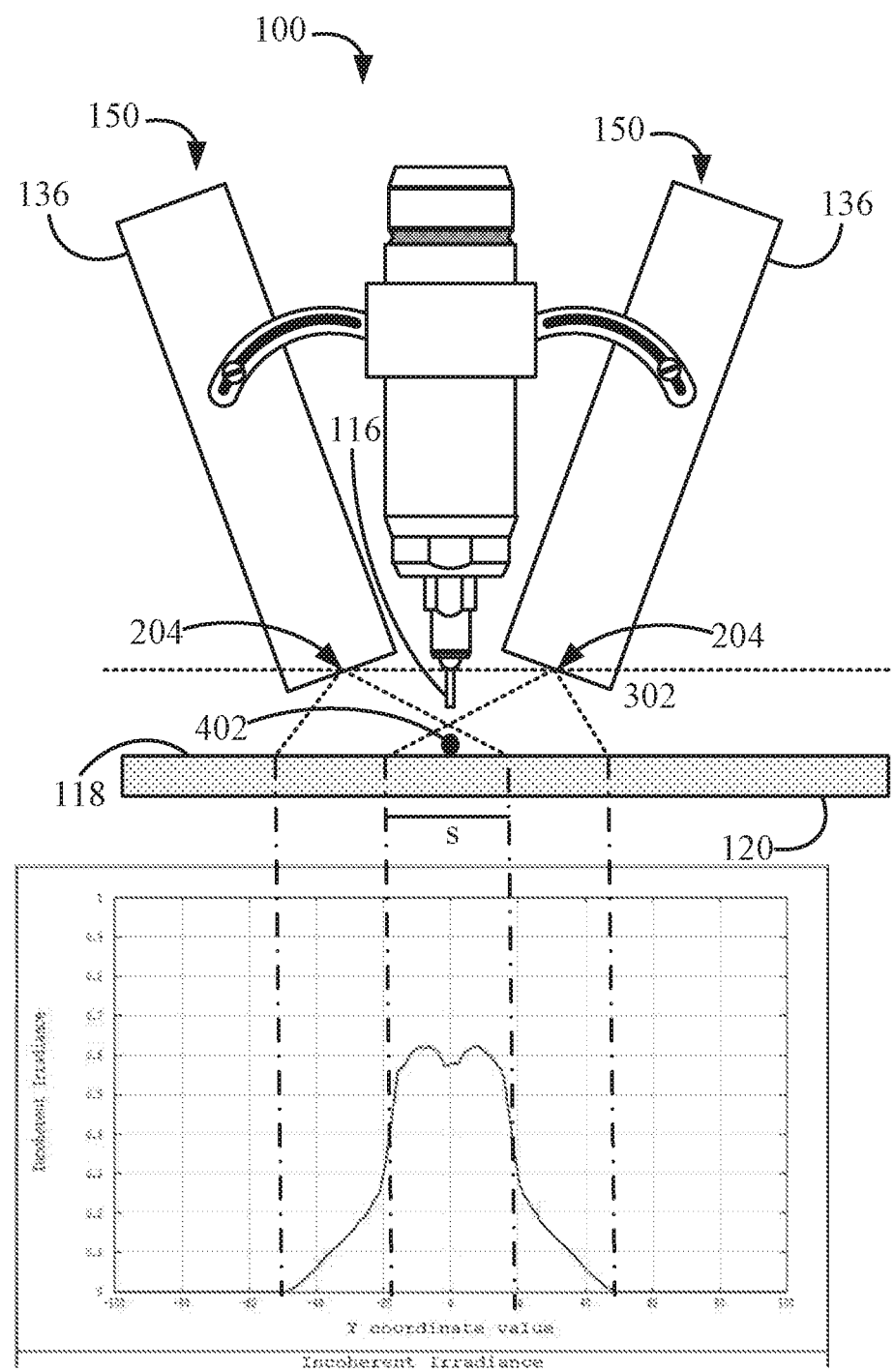
FIG. 4 is an elevated lateral plan view simplified illustration of the positioning of one or more sources of curing radiation relative to an extrusion head and nozzle and a graph of distribution of radiation energy over a surface in accordance with still another example.

Referring now to FIG. 4, which is an elevated lateral plan view simplified illustration of the positioning of one or more sources of curing radiation 136 relative to extrusion head 114 and extrusion nozzle 116 and a graph of distribution of radiation energy over surface 118 of printing table 120. As shown in FIG. 4, when at least two sources of UV radiation such as sources of curing radiation 136 are attached to extrusion head 114 changes in positioning parameters angle (a), elevation (h) and distance (d) can affect the distribution pattern of the curing radiation energy impinging on surface 118 of printing table 120 thus affecting curing radiation parameters at the location of the deposited curable material 402 to be cured.

In a non-limiting example depicted in FIG. 4, each of sources of curing radiation 136 includes 25 LEDs for a total radiation fluence of 50W and are positioned at an optimal working point for the specific object to be printed so that to provide maximum radiation power and uniformity. Angle (a) is 20 degrees, elevation (h) is 20 mm and distance (d) is 20 mm.

Commonly, such divergence of the UV radiation beam can bring about distribution of the impinging radiation energy over a relatively wide area of surface 118. Authors of the instant application have found that positioning sources of curing radiation 136 according to the above described positioning parameters can narrow the distribution of effective (i.e., maximal uniform level of radiation energy operative to fully cure deposited curable material 402) radiation impinging on surface 118 to a sector (s) including deposited curable material 402. This can greatly contribute to the efficiency of the application of UV curing energy.

As shown in the graph of FIG. 4 the distribution of irradiant energy impinging on surface 118 is such that only a limited sector (s) (i.e., spot size) of the overall irradiated area of surface 118, which includes the location of deposited curable material 402 to be cured, provides almost maximal uniform level of irradiant energy or fluence, uniformly distributed throughout sector (s) so that to effectively (fully) cure deposited curable material 402. The area of sector (s) can be in some cases between 5 and 35 mm, more commonly between 10 and 30 mm and most commonly between 15 and 25 mm. The level of irradiant energy or fluence greatly drops outside the borders of sector (s) demonstrating the high efficiency of energy application in which energy is applied only where it is required.

Figure 5:
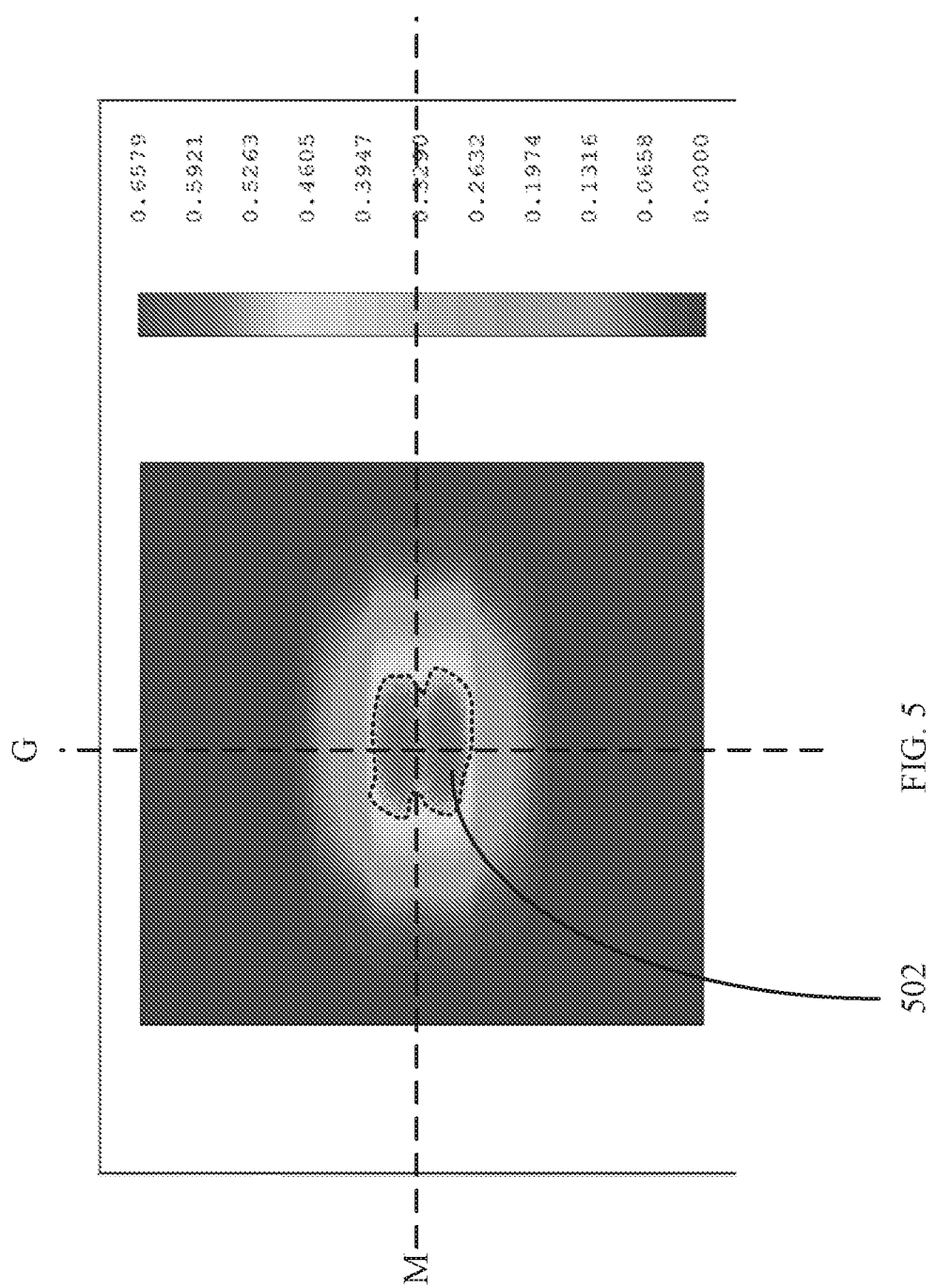
FIG. 5 is a mapping diagram of radiation fluence impinging on a surface in accordance with still another example.

It has also been shown experimentally and as depicted in FIG. 5, which is a mapping diagram of curing radiation fluence impinging on a surface, that when employing linear sources of curing radiation 136 such as that depicted in FIG. 2 and positioning them in accordance with the positioning parameters disclosed in the non-limiting example of FIG. 4, the uniformity of curing radiation distribution impinging on surface 118 of printing table 120 can be maintained not only along a short axis (G) being normal to LED array 202 central longitudinal axis 206, but also along a long axis (M) centrally located in between LED arrays 202 and being parallel to central axes 206.

As shown in FIG. 5, sector (s), demarcated with a phantom-line border outline and designated numeral 502 is a deposited curable material effective curing sector being uniformly impinged upon by the highest (symbolized by the darkest shade) level of curing radiation energy. As described, curable material deposition components, namely extrusion head 114 and extrusion nozzle 116 in concert with the curing system for printing of 3-D objects 150 sources of curing radiation 136 operating in unison ensure that sector (s) has directional vector movement shadowing extrusion nozzle 116 and that curable material 104 is continuously deposited inside sector (s) being cured concurrently by curing system for printing of 3-D objects 150.

The positioning of sources of curing radiation 136 as explained above, attached to extrusion head 114 and in accordance with optimal positioning parameters described above, allows to achieve optimal and effective curing parameters, i.e., spot size and radiation flux in sector (s) concurrently or almost immediately following deposition of curable material 104 by extrusion nozzle 116. This allows to reduce printing throughput time by enabling an increase in the speed of translation of extrusion head 114, which depends on the curing of a first layer before depositing a second layer on top of the first layer.

Experimentation showed that under the configuration and positioning parameters described in the non-limiting example of FIG. 3, full (effective) curing of a deposited curable material 104 such as, for example, a pseudoplastic resin can be achieved at a printing speed of 500 mm/sec. Further experimentation has shown that full or at least sufficient curing can be achieved at speeds between 400 mm/sec and 1000 mm/sec and more commonly between 500 mm/sec and 800 mm/sec. These speeds may be sufficient for most known additive printing resins.

Additionally, it has also been found that the level of curing radiation energy applied to the object being manufactured depends, among others, on the characteristics of the object being manufactured. Hence, Computer 128 can be configured to optimize the required curing radiation power output based on the characteristics of the 3D object being manufactured and the curing parameters required thereby.

Figure 6:
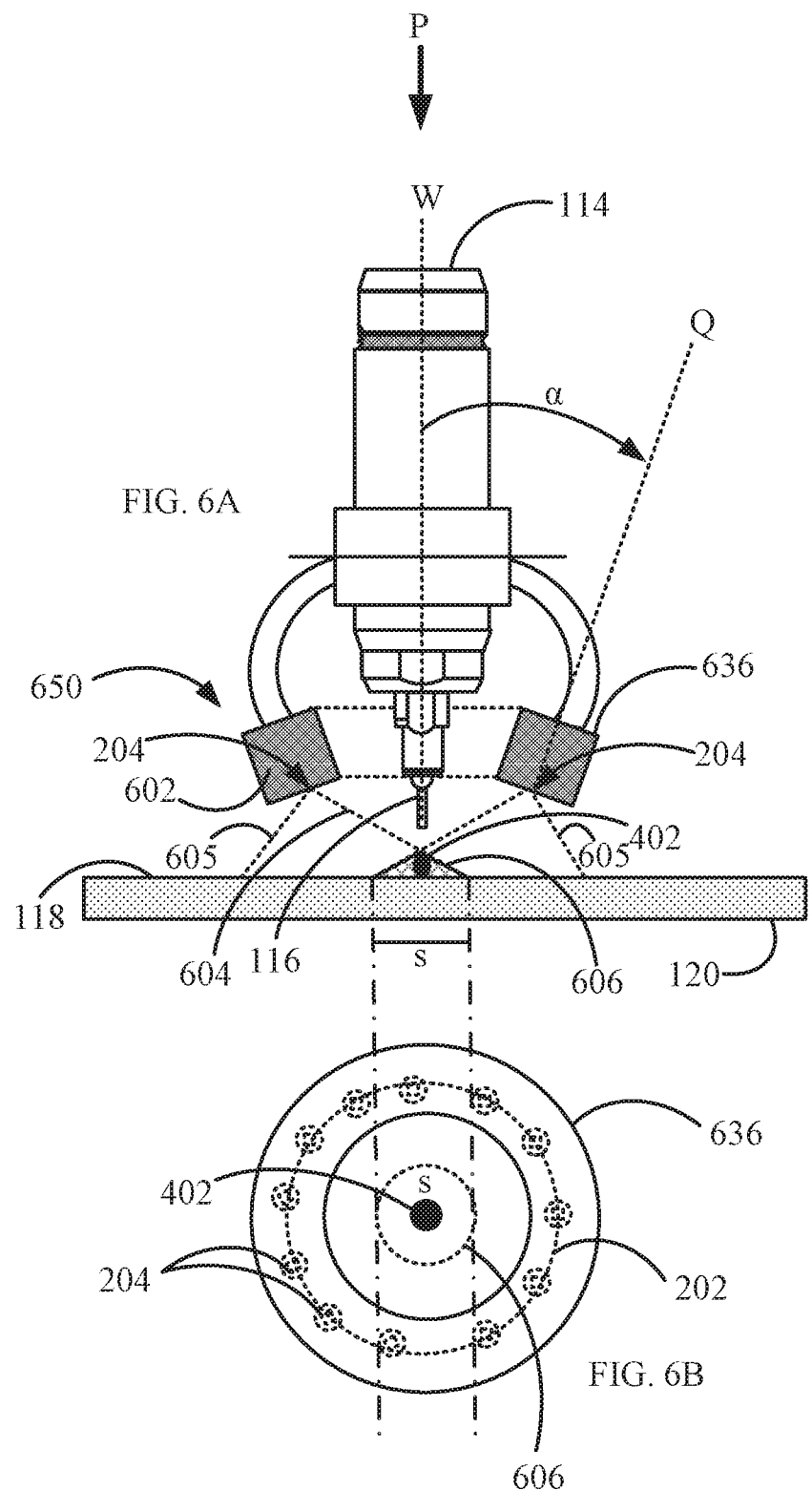
FIGS. 6A and 6B, together referred to as FIG. 6, are an elevated side partial cross-section view and top view simplified illustrations of a source of curing radiation for an additive printing process in accordance with yet another example.

Reference is now made to FIGS. 6A and 6B, together referred to as FIG. 6, which are an elevated side partial cross-section view and top view [from the direction indicated by an arrow (P)] simplified illustrations of another example of a curing system for printing of 3-D objects 650 for an additive printing process. In FIG. 6 source of curing radiation 636 can have a ring-form geometry, be attached to extrusion head 114 and positioned concentrically about extrusion head 114 extrusion nozzle 116. The cross-section 602 of ring-form source of curing radiation 636 can be angled at an angel (a) relative to central axis (W) of extrusion head 114 extrusion nozzle 116 similar to the example of FIG. 3.

In this configuration, the inner border 604 of the diverging UV radiation beams 605 emitted from each of the LEDs 204 in source of curing radiation 636 creates an evenly distributed uniform cone of radiation beams 606 to create a sector (s) of even curing energy distribution on surface 118 of printing table 120. Hence the symmetrical geometry of ring-form source of curing radiation 636 brings about a uniform distribution of radiation curing energy throughout sector (s) in a similar fashion as that described in FIG. 5.

Figure 7:
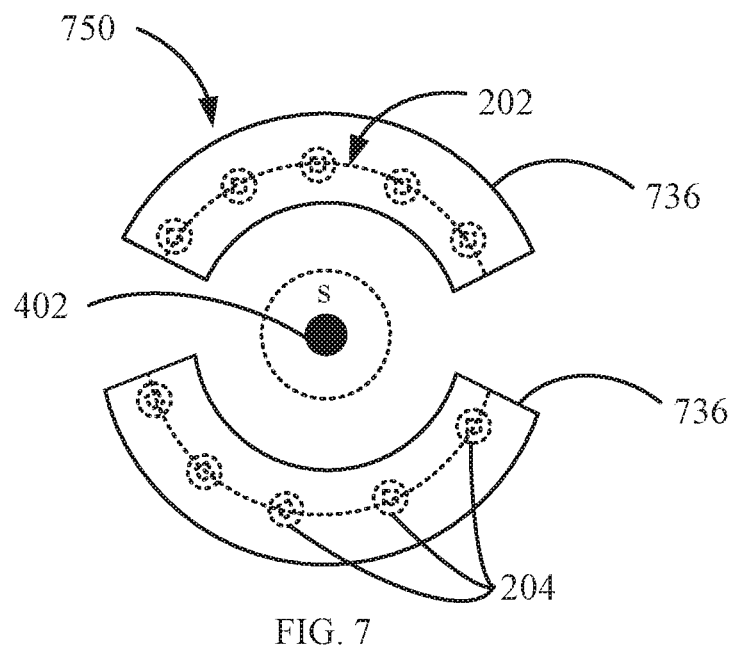
FIG. 7 is a top view simplified illustration of a source of curing radiation for an additive printing process in accordance with yet another example.
Figure 8:
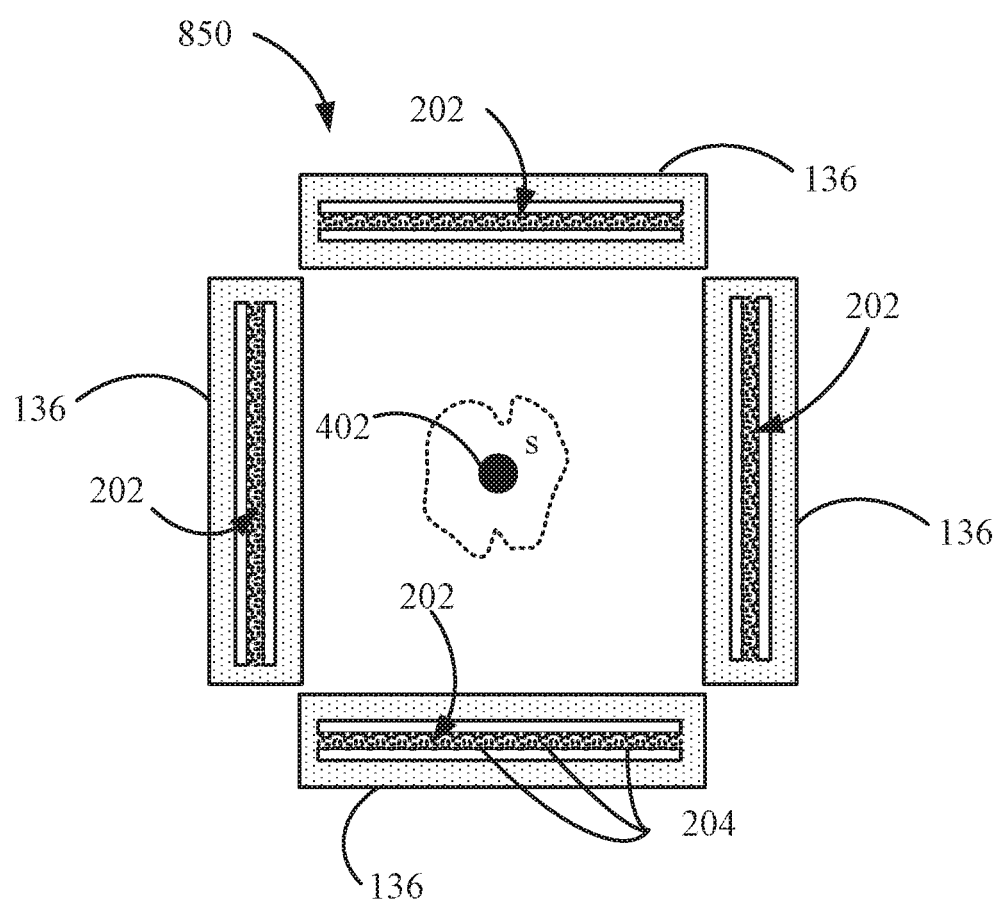
FIG. 8 is a top view simplified illustration of a source of curing radiation for an additive printing process in accordance with yet another example in accordance with still another example.

Referring now to FIGS. 7 and 8, which are two more curing systems for printing of 3-D objects in accordance with two examples. FIG. 7 depicts a curing system 750 including two semi-circle sources of curing radiation 736, similar in construction to ring-form source of curing radiation energy 636. Sources of curing radiation 736 can be attached to extrusion head 114 in a similar manner as depicted in the example of FIG. 3 and positioned concentrically about the extrusion head extrusion nozzle.

Attachment of ring-form source of curing radiation energy 636 to extrusion head 114 can be done in a modular configuration so that source of curing radiation energy 636 can replace sources of curing radiation 136 if desired. The advantage of this configuration is in that though it can easily replace sources of curing radiation 136 and can benefit from the same modular method of attachment as that depicted in FIG. 3, it can still preserve the symmetrical geometry of ring-form source of curing radiation 636 and bring about a uniformity of distribution of radiation curing energy throughout sector (s).

FIG. 8 illustrates another example of a curing system 850. In this configuration, four sources 136 are attached on four sides of extrusion head 114 in a similar fashion as that depicted in FIG. 3, the central longitudinal axis 206 of each array 202 being normal to central longitudinal axis 206 of the array 202 adjacent thereto. This configuration is simple to construct and complements the configuration depicted in FIG. 2 to provide a symmetrical application of curing radiation energy onto deposited curable material 402 by creating a sector (s) similar to that created by the examples in FIGS. 6 and 7.

Figure 9:
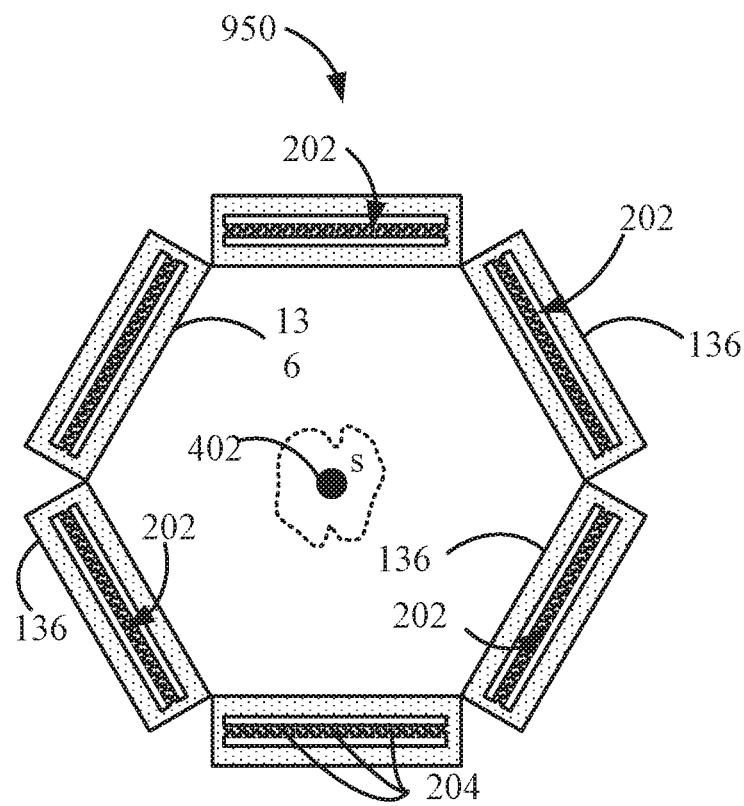
FIG. 9 is a top view simplified illustration of a source of curing radiation for an additive printing process in accordance with an example.

Reference is now made to FIG. 9 which is yet another example of a curing system for printing of 3-D objects. In this configuration, six sources 136 are attached on six sides of extrusion head 114 in a similar fashion as that depicted in FIG. 3, forming as hexagon. This configuration is simple to construct and complements the configuration depicted in FIG. 2 to provide a symmetrical application of curing radiation energy onto deposited curable material 402 by creating a sector (s) similar to that created by the examples in FIG. 8.

Figures 10A, 10B:
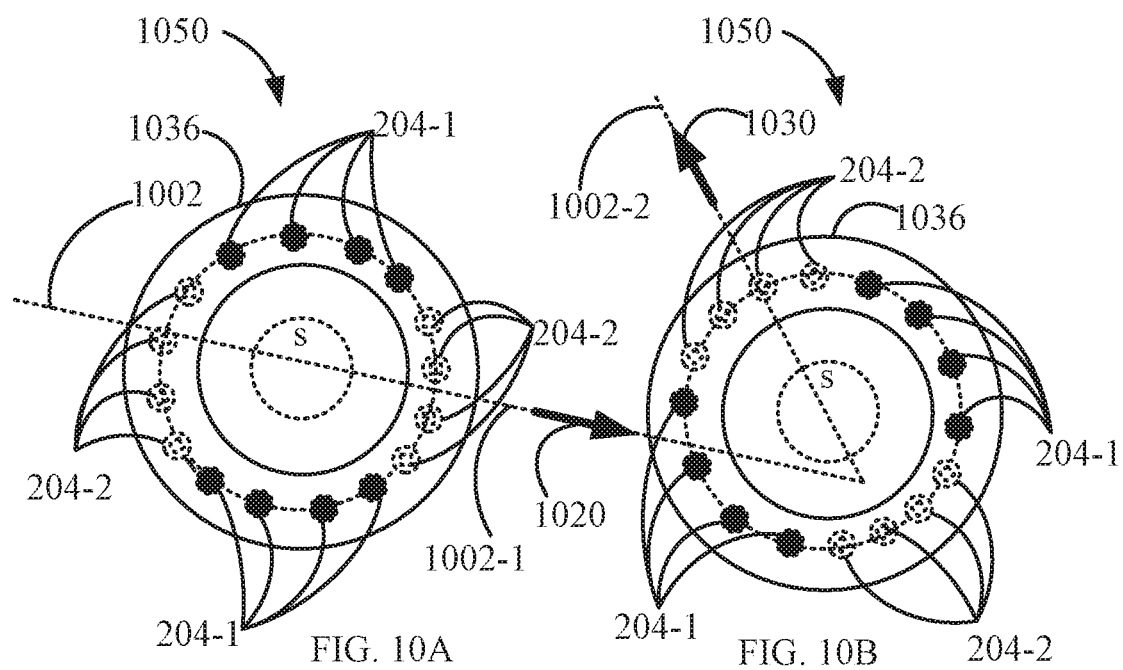
FIGS. 10A and 10B, together referred to as FIG. 10 are a top view simplified illustration of operation and movement of a curing system for printing of 3-D objects in accordance with still another example.

FIGS. 10A and 10B, together referred to as FIG. 10, depict an example, in which computer 128 can be configured to control operation of a curing system for printing of 3-D objects 1050 and source of curing radiation 636 similar to system 650 of FIG. 6 and synchronize system 1050 with the printing mode (i.e., movement of nozzle 116 during deposition of curable material 104. In FIG. 10, extrusion head 114, extrusion nozzle 116 and deposited material have been removed for purposes of clarity.

FIG. 10 illustrates vector movement of system 1050 shadowing vector directional vector movement of nozzle 116 (not shown) along a predetermined vector path depicted by a phantom line 1002. In this configuration computer 128 has determined eight LEDs 204-1 symmetrically distributed on both sides of vector path 1002 to be sufficient for curing material deposited inside sector (s). In FIG. 10 operating LEDs 204-1 are darkened and non-operating LEDs 204-2 are clear in appearance. FIG. 10A shows system 500 moving along a first leg 1002-1 of predetermined vector path 1002 in a direction indicated by an arrow designated reference numeral 1020.

As shown in FIG. 10B, at the end of first leg 1002-1, vector path 1002 turns sharply to become leg 1002-2. Upon change in direction of extrusion nozzle 116 (not shown) in a direction indicated by an arrow designated reference numeral 1030 along vector path 1002, computer 128 rearranges the order of LEDs by turning off unnecessary LEDs 204-1 and turning on necessary LEDs 204-2 without rotating curing system for printing of 3-D objects 1050 ring-form source of curing radiation 1036. Hence, a sector (s) in which a uniformity of curing radiation energy distribution impinging on surface 118 of printing table 120 can be maintained without rotation of curing system for printing of 3-D objects 1050 source of curing radiation 1036 but by controlling individual LEDs as determined by computer 128.

Figure 11A:
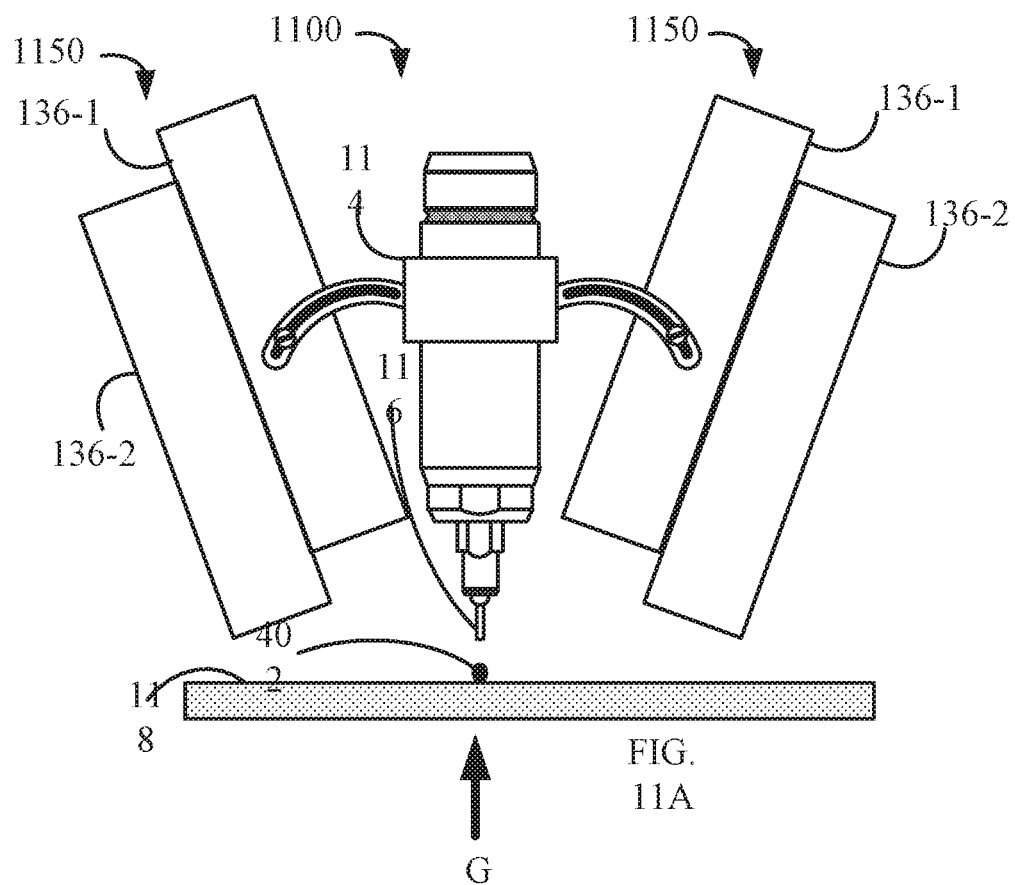
FIGS. 11A and 11B, together referred to as FIG. 11 are an elevated lateral view simplified illustration of tiered positioning of one or more sources of curing radiation relative to an extrusion head and nozzle in accordance with yet another example.
Figure 11B:
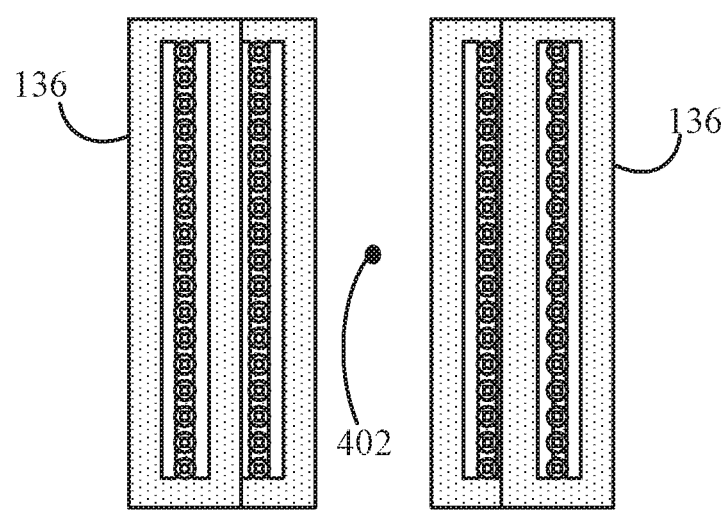

Reference is now made to FIGS. 11A and 11B, together referred to as FIG. 11, which are lateral and Plan view simplified illustrations of another example of a curing system for printing of 3-D objects. FIG. 11B illustrates a view of curing system 1150 taken from a direction indicated in FIG. 11A by an arrow designated reference letter (G). System for printing of 3-D objects 1100 includes a tiered curing system for printing of 3-D objects 1150 including two or more sources of curing radiation 136 that can be moveably attached to extrusion head 114 flanking extrusion head 114 and extrusion nozzle 116 from at least one side thereof in a similar fashion to that described above and depicted in FIGS. 3 and 4. In the example of FIG. 11, each tier on either flank of extrusion head 114 nozzle 116 can be composed of two sources of curing radiation 136-1 and 136-2 arranged in a stepwise manner.

The tiered configuration depicted in FIG. 11 allows to increase the flux of radiation to cure curable materials that require such an increased flux while maintaining the same spot size or sector (s) (e.g., FIG. 4) size and the movement qualities described above.

Figure 12A:
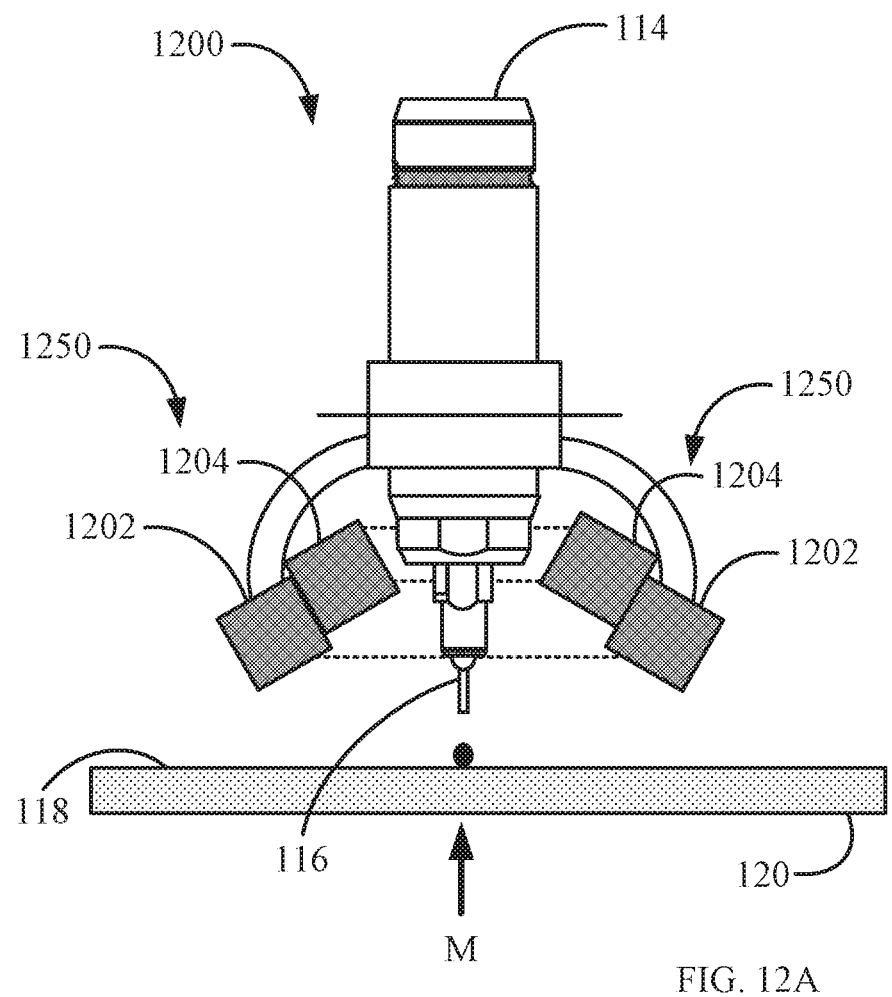
FIGS. 12A and 12B, together referred to as FIG. 12 are an elevated lateral view simplified illustration of tiered positioning of one or more sources of curing radiation relative to an extrusion head and nozzle in accordance with yet another example.
Figure 12B:
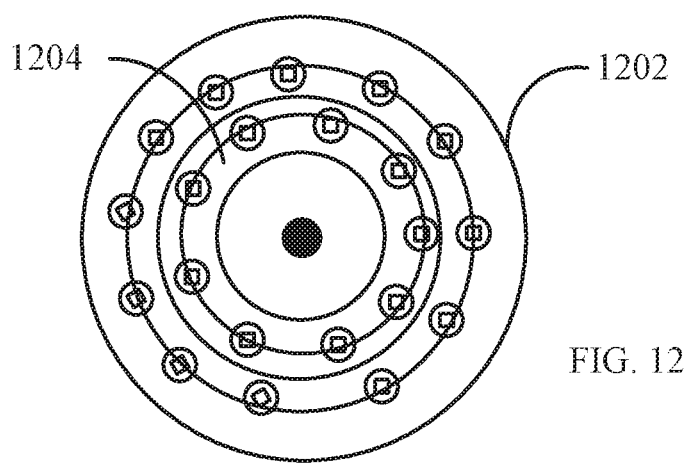

FIGS. 12A and 12B, together referred to as FIG. 12, are lateral and plan view simplified illustrations of yet another example of a curing system for printing of 3-D objects. In FIG. 12, FIG. 12B illustrates a view of curing system 1250 taken from a direction indicated in FIG. 12A by an arrow designated reference letter (M). System for printing of 3-D objects 1200 includes a tiered curing system for printing of 3-D objects 1250 including two or more sources of curing radiation 1202 and 1204 that can be 636 can have a ring-form geometry and be attached to extrusion head 114 and positioned concentrically about extrusion head 114 and extrusion nozzle 116 in a similar fashion to that described above and depicted in FIG. 6. In the example of FIG. 12, each tier concentrically arranged about extrusion head 114 and nozzle 116 can be composed of two sources of curing radiation 1202 and 1204 arranged in a stepwise manner.

The tiered configuration depicted in FIG. 12 allows to increase the flux of radiation to cure curable materials that require such an increased flux while maintaining the same spot size or sector (s) (e.g., FIG. 4) size and the movement qualities described above.

Curing system for printing of 3-D objects 1250, similar to system 1050 described above and depicted in FIG. 10, can also be controlled by computer 128 so that to support directionality of the vector movement thereof, shadowing the concurrent directional vector movement of extrusion head 114 and nozzle 116.

It will be appreciated by persons skilled in the art that the present disclosure is not limited to what has been particularly shown and described hereinabove. Rather, the scope of the method and apparatus includes both combinations and sub-combinations of various features described hereinabove as well as modifications and variations thereof which would occur to a person skilled in the art upon reading the foregoing description and which are not in the prior art.

The invention claimed is:

1. A curing system for printing of 3D objects comprising:
at least one extrusion head having an extrusion nozzle; and
at least one source of curing radiation having an array of LEDs and having a ring-form geometry attached to the at least one extrusion head and positioned concentrically about the extrusion nozzle; and
an X Y-Z directional vector movement system configured to move the extrusion nozzle in three directions (X-Y-Z);
a computer configured to control operation of the curing system; and
wherein when the X-Y-Z direction vector movement system moves at least the extrusion nozzle along a predetermined vector path, the computer determines a number of LEDs to be sufficient for curing material deposited inside one or more sector(s) and operates the determined LEDs; and upon changes in direction of extrusion nozzle movement, the computer rearranges an order of operating LEDs without rotating the at least one source of curing radiation by turning ON LEDs which are necessary to maintain uniformity of curing radiation energy in the one or more sectors(s) and turning OFF LEDs which are unnecessary.

2. The curing system according to claim 1, wherein the at least one source of curing radiation moves in a vector directional movement that shadows the vector directional movement of the extrusion nozzle.

3. The curing system of claim 1, wherein the X-Y-Z directional vector movement system configured to move the extrusion nozzle in three directions (X-Y-Z) concurrently provides the at least one source of curing radiation with a vector directional movement that shadows a vector directional movement of the at least one extrusion head and the extrusion nozzle.

4. The curing system of claim 1, wherein two semi-circle sources of curing radiation form the ring-form geometry of the at least one source of curing radiation, is attached to the at least one extrusion head, and positioned concentrically about the at least one extrusion head and the extrusion nozzle.

* * * * *